May 9, 1933.    R. M. HEINTZ    1,907,805
OILING SYSTEM
Filed March 29, 1930

INVENTOR,
RALPH M. HEINTZ.
BY Donald K. Lippincott
ATTORNEY.

Patented May 9, 1933

1,907,805

UNITED STATES PATENT OFFICE

RALPH M. HEINTZ, OF PALO ALTO, CALIFORNIA, ASSIGNOR TO HEINTZ & KAUFMAN, LTD., OF SAN FRANCISCO, CALIFORNIA, A CORPORATION OF NEVADA

OILING SYSTEM

Application filed March 29, 1930. Serial No. 440,002.

My invention relates to oiling systems for internal combustion engines, and particularly to engines of the two-stroke cycle or "two-cycle" type.

Among the objects of my invention are: First, to provide a pressure oiling system applicable to two-cycle engines; second, to provide a system giving positive lubrication of all moving parts; third, to provide an oiling system comprising no additional parts; and fourth, to provide a system wherein the crank-pin and connecting-rod are utilized as a valve.

My invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing.

Figure 1:
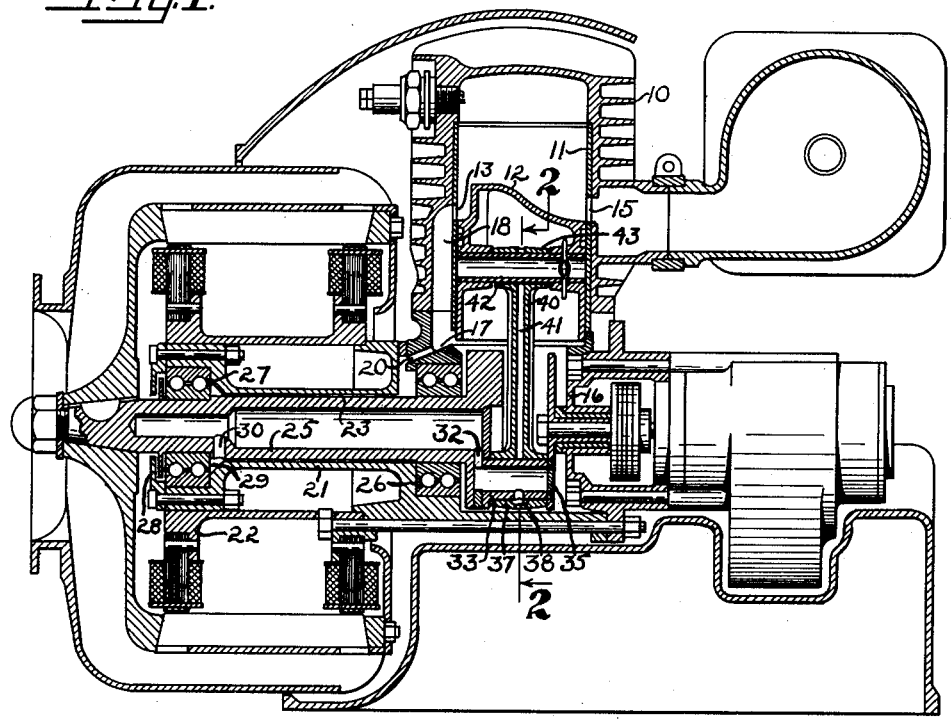
Figure 1 is an axial sectional view of a two-cycle gas-engine generator embodying my invention.
Figure 2:
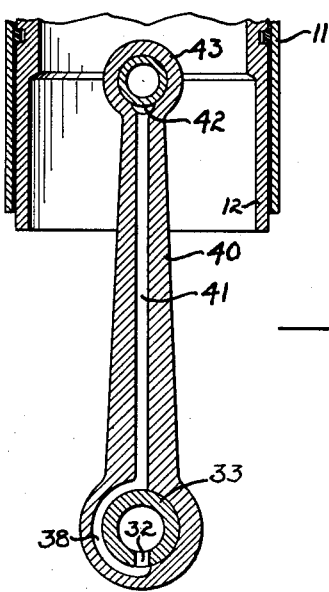
Figure 2 is a fragmentary sectional view, the plane of section being on the line 2—2 of Figure 1.

Substantially all internal combustion engines accomplish a cycle comprising intake, compression, explosion, and exhaust. In the four-stroke cycle or "four-cycle" engines each of these operations takes place in the same cylinder and during one stroke of the operation. In the two-stroke cycle or "two-cycle" engine, in which every alternate stroke is a power stroke, the suction and a portion of the compression must be accomplished in a separate chamber, and because of the simplicity which this construction affords, the chamber is usually the crank-case. The use of the crank-case as a compression chamber very largely precludes its use as an oil reservoir, and hence makes splash lubrication of the wrist-pin difficult. As simplicity is one of the prime reasons for the use of a two-cycle engine, the additional complications entailed by the use of a pressure oiling system are not ordinarily warranted, and the lubrication of the wrist-pin and crank bearings have therefore been among the most serious problems to be met in two-cycle engine designs.

In engines of this character, therefore, the lubricant has usually been introduced in the explosive mixture, and condensation from the mixture has been relied upon to provide lubrication within the crank-case.

In accordance with my invention this method of introducing the lubricant may be retained, or it may be introduced separately. In general terms, the invention comprises a sump within the compression chamber wherein the lubricant may collect, and a duct, leading from the sump, to atmospheric pressure, or at least to a point in which the pressure is less than the mean pressure within the compression chamber. This point may conveniently also be referred to as a sump, and from this second sump a return duct leads back to the compression chamber. Valve means located within this duct are operated in time with the rotation of the engine, so that the duct is open during the portion of the cycle when the pressure within the cylinder is below the mean. In practice, a hollow crank-shaft, crank-pin, and connecting-rod, may form the return duct, while the valve comprises a transverse opening in the hollow crank-pin cooperating with a segmental channel in the connecting-rod bearings communicating with the hollow connecting-rod. By positioning the opening in the crank-pin and the segmental channel properly, the valve may be timed to produce a positive circulation of oil in the system which lubricates all of the bearings in the system, including the difficult wrist-pin bearing.

The nature of my invention may best be understood by reference to the accompanying drawing, which show an engine-driven electric generator embodying a preferred form of the invention. The engine itself is substantially conventional in type, comprising a cylinder 10 which is provided with a liner 11 within which the piston 12 reciprocates. The cylinder and liner are provided with the customary transfer and exhaust ports 13 and 15, and the cylinder is secured to the crank-case 16 which functions as a compression chamber.

A sump 17 is formed in the compression chamber below the liner 11. Lubricant, admitted with the explosive mixture thru the usual intake port (not shown) will condense on the walls of the liner and in the passage 18 connecting the crank-case with the cylinder, and will collect in the sump.

An opening 20 leads from the sump into a hollow crank-shaft housing 21 which supports the generator stator 22, the housing being sufficiently large to form a duct 23 between the housing and the hollow crank-shaft 25. It will be seen that this duct supplies oil to the crank-shaft bearings 26 and 27. The housing 21 terminates in an annular retainer 28, which, with the outer end of the housing, forms an outer sump 29 which is exposed substantially to atmospheric pressure.

A hole 30 formed thru the side of the crank-shaft communicates from the sump to the opening within the shaft. This opening leads thru the shaft, the hole 32, and the hollow crank-pin 33, to a hole 34 which leads transversely thru the wall of the crank-pin. The end of the pin is closed by a plug 35. The crank-pin is surrounded by the crank-pin bearing 37, in which a segmental channel 38 is formed which communicates with the hollow connecting-rod 40. The opening 41 in the connecting-rod connects with an oil channel 42 formed in a wrist-pin bearing 43, and thus communicates again with the crank-case.

In the operation of the engine, the pressure in the crank-case fluctuates about a mean which is higher than atmospheric pressure. The oil in the sump 17 is exposed to the crank-case pressure, and will therefore tend to flow out of the crank-case and thru the duct 23 to the outer sump 28 which is at atmospheric pressure.

Although the mean pressure within the crank-case is higher than atmospheric, the pressure is below atmospheric during the up-stroke of the piston. During this portion of the stroke the hole 30 in the outer end of the crank-shaft communicates with the oil in the outer sump, and the hole 34 is open to the segmental channel 38 in the crank-pin bearing and thence to the crank-case pressure thru the hollow connecting-rod and the oil channel 42. Oil is therefore sucked thru the crank-shaft and connecting-rod and is supplied to the wrist-pin bearing, from whence it again runs down the walls of the cylinder to return to the sump 17.

During the down stroke of the piston, when the pressure within the crank-case is above atmospheric, the hole 32 is closed by the closely fitting bearing, which prevents the oil in the return duct being forced back into the sump 29.

It is obvious that the sump 29 need not operate under atmospheric pressure as long as the pressure to which it is exposed is less than the mean pressure within the compression chamber. It may even be made to operate at a pressure higher than the mean pressure within the cylinder if the valve means are arranged to control the outflow instead of the inflow.

I claim:

1. In combination with an internal combustion engine having a compression chamber for an explosive mixture wherein the pressure oscillates about a mean value, an oil sump external to said chamber and exposed to a pressure differing from the mean value of the chamber pressure, an oil duct leading from said chamber to said sump, a return duct connecting said sump to said chamber, and a rotating valve in one of said ducts timed with the pressure oscillations to cause a unidirectional flow of oil thru the duct system.

2. In combination with an internal combustion engine having a compression chamber for an explosive mixture wherein the pressure oscillates about a mean value, an oil sump in said chamber, a second sump external to the chamber and under a pressure less than said mean value, a duct connecting said sumps, a return duct from said second sump to said chamber, and a rotating valve in said return duct timed with the pressure oscillations.

3. In combination with a two-cycle internal combustion engine having a crank-case wherein an explosive mixture is compressed, an oil sump in the crank-case, an oil duct connecting with said sump, a second sump exposed to substantially atmospheric pressure and connected to said duct, a return duct from said second sump to the crank-case, and a rotating valve in said return duct timed with the engine and closed during the compression of the mixture.

4. In a two-cycle internal combustion engine having a crank-case wherein an explosive mixture is compressed, a crank having a hollow crank pin with a transverse opening in one side thereof, a bearing surrounding said pin and having a segmentary annular oil channel therein alined with said opening, and an oil duct connecting with said channel opening into said crank-case, whereby an oil passage from said crank pin to said crank case is cyclically opened and closed by the operation of said engine.

5. In a two-cycle internal combustion engine having a crank-case wherein an explosive mixture is compressed, an oil sump in said crank-case, a crank-shaft for said engine, an oil duct surrounding said crank-shaft and connected to said sump, a second sump terminating said duct and exposed to atmospheric pressure, a crank on said shaft having a crank-pin, said shaft, crank and crank-pin having an oil passage formed therein terminating in transverse openings into said second sump and thru the side of the pin respectively, a bearing surrounding said pin and having a segmentary annular oil channel therein alined with said opening, and an oil duct connecting with said channel opening into said crank-case.

6. In a two-cycle internal combustion engine having a crank-case wherein an explosive mixture is compressed, a crank having a hollow pin with an opening thru the side thereof, an oil duct connected to said hollow pin, a hollow connecting-rod for said engine, a crank bearing on said connecting-rod having a segmentary annular oil channel alined with the opening in said pin and opening into the hollow connecting-rod, and a wrist-pin bearing having an oil channel opening into said connecting-rod and said crank-case, whereby an oil channel from said crank to said wrist pin is opened and closed cyclically by the operation of the engine.

7. In combination with a compression chamber wherein the pressure of a gas oscillates about a mean pressure, an oil sump within the chamber, a duct system connecting to said sump and returning to said compression chamber and having therein an opening exposed to a pressure different from the mean pressure in said chamber, and a rotating valve in said duct system timed with the pressure oscillations and opening in a portion of the cycle to cause a circulation of oil in the duct system.

8. An oiling system comprising a chamber wherein the pressure oscillates about a mean, a duct system leaving and returning to said chamber, and a rotating valve in said duct system timed with the pressure oscillations for inducing a unidirectional circulation of oil in said duct system in response to the pressure variations in said chamber.

9. An oiling system comprising a chamber, a reciprocating piston for producing pressure oscillations within said chamber, a duct system leaving and returning to said chamber, a hollow connecting-rod for said piston forming a portion of said duct system, and a ported crank for said connecting-rod forming a valve timed with the reciprocation of the piston whereby the pressure oscillations within the chamber cause a unidirectional circulation of oil within the system.

10. In combination with an internal combustion engine having a compression chamber for an explosive mixture wherein the pressure oscillates about a mean value, an oil sump in said chamber, a second sump external to the chamber and under a pressure less than said mean value, a duct connecting said sumps, a return duct from said chamber, and positively actuated valve means in said return duct timed with the pressure oscillations.

11. In combination with an internal combustion engine having a compression chamber for an explosive mixture wherein the pressure oscillates about a mean value, an oil sump in said chamber, a second sump external to the chamber and under a pressure less than said mean value, a duct connecting said sumps, a return duct from said chamber, and a positively actuated rotary valve in said return duct timed with the pressure oscillations.

12. In combination with an internal combustion engine having a compression chamber wherein the pressure of a gas oscillates about a mean pressure, an oil sump in said chamber, a duct system connecting to said sump and returning to said compression chamber and having therein an opening exposed to a pressure different from the mean pressure in said chamber, and valve means positively operated by said engine in said duct system timed with the pressure oscillations and opening in a portion of the cycle to cause a circulation of oil in the duct system.

13. In combination with an internal combustion engine having a compression chamber wherein the pressure of a gas oscillates about a mean pressure, an oil sump in said chamber, a duct system connecting to said sump and returning to said compression chamber and having therein an opening exposed to a pressure different from the mean pressure in said chamber, and a rotary valve positively operated by said engine in said duct system timed with the pressure oscillations and opening in a portion of the cycle to cause a circulation of oil in the duct system.

In testimony whereof, I have hereunto set my hand.

RALPH M. HEINTZ.